(12) United States Patent
Kim

(10) Patent No.: US 6,481,051 B1
(45) Date of Patent: Nov. 19, 2002

(54) VERTICAL ROTATION SHAFT ASSEMBLY FOR SWING-ARM TYPE DOOR

(75) Inventor: Kyung-Hee Kim, Jeonju (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/651,468

(22) Filed: Aug. 30, 2000

(30) Foreign Application Priority Data

Aug. 31, 1999 (KR) .............................................. 99-36591

(51) Int. Cl.[7] .................................................. E05F 3/20
(52) U.S. Cl. .............................. 16/54; 16/50; 384/156; 403/122
(58) Field of Search .............................. 16/54, 50, 325, 16/328, 276; 384/129, 154, 156, 245; 403/121, 122, 76, 52, 65, 71, 119, 164, 165, 166

(56) References Cited

U.S. PATENT DOCUMENTS

| | | | | |
|---|---|---|---|---|
| 3,158,391 A | * | 11/1964 | Carmi et al. ................ | 403/76 |
| 4,798,476 A | * | 1/1989 | Sakatani et al. ............ | 384/245 |
| 4,829,628 A | * | 5/1989 | Vuksic ......................... | 16/54 |
| 4,864,690 A | * | 9/1989 | Chen ........................... | 16/276 |
| 5,102,255 A | * | 4/1992 | Heinz ......................... | 403/121 |
| 5,413,031 A | * | 5/1995 | Kohlmeyer ................ | 403/122 |
| 5,568,976 A | * | 10/1996 | Gabriele .................... | 384/245 |
| 5,590,440 A | * | 1/1997 | Pelt et al. .................... | 16/50 |
| 6,205,619 B1 | * | 3/2001 | Jang ............................. | 16/54 |

* cited by examiner

Primary Examiner—Anthony Knight
Assistant Examiner—Doug Hutton
(74) Attorney, Agent, or Firm—Christie, Parker & Hale, LLP

(57) ABSTRACT

A vertical rotation shaft assembly for a swing-arm type door having a door plane and a cylinder for actuating the door includes an upper rotational shaft extended from the cylinder as a piston rod and a lower rotational shaft inserted into an edge of the door plane, the lower rotational shaft being coaxially arranged with the upper rotational shaft.

8 Claims, 3 Drawing Sheets

VERTICAL ROTATION SHAFT ASSEMBLY FOR SWING-ARM TYPE DOOR

BACKGROUND OF THE INVENTION (a) Field of the Invention

The present invention relates to a swing-arm door, and in particular, to a vertical rotation shaft assembly for a swing-arm type door in which shaft misalignment due to wear is avoided.

(b) Description of the Related Art

Commonly, two types of exit doors for buses are adopted, a swing-arm door and a bi-fold door. The bi-fold door consists of two panels fastened together with a hinge or hinges such that the door is opened by a trailing panel being folded to a leading panel. The swing-arm door consists of a panel suspended by a curved arm attached to a rotating door so as to be opened by operation of a swing arm.

FIG. 1 is a partial cross-sectional view showing a prior art vertical rotational shaft assembly of a swing-arm door.

The vertical shaft assembly is fixedly mounted to a vehicle body, and as shown in FIG. 1, comprises a vertical shaft 1 surrounded by an exterior pipe 3 so as to slide up and down therein. To enhance the movement of the vertical shaft 1, a sliding pipe 4 is interposed between the vertical shaft 1 and the exterior pipe 3, and a coil spring 5 is mounted around a lower portion of the vertical shaft 1.

This vertical shaft assembly, however, has a drawback in that the sliding pipe 4 is worn by frequent friction with the rotational vertical shaft 1 so as to generate a gap between the shaft 1 and the sliding pipe 4 such that the operation of the swing-arm door becomes unstable and the durability of the door is degraded.

SUMMARY OF THE INVENTION

The present invention has been made in an effort to solve the above problems of the prior art.

It is an object of the present invention to provide a vertical shaft assembly capable of preventing swing-arm door malfunctions due to wearing of the sliding pipe.

To achieve the above object, the vertical rotation shaft assembly for the swing-arm type door according to a preferred embodiment of the present invention comprises an upper rotational shaft extended from the cylinder as a piston rod and a lower rotational shaft inserted into an edge of the door plane, the lower rotational shaft being coaxially arranged with the upper rotational shaft.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
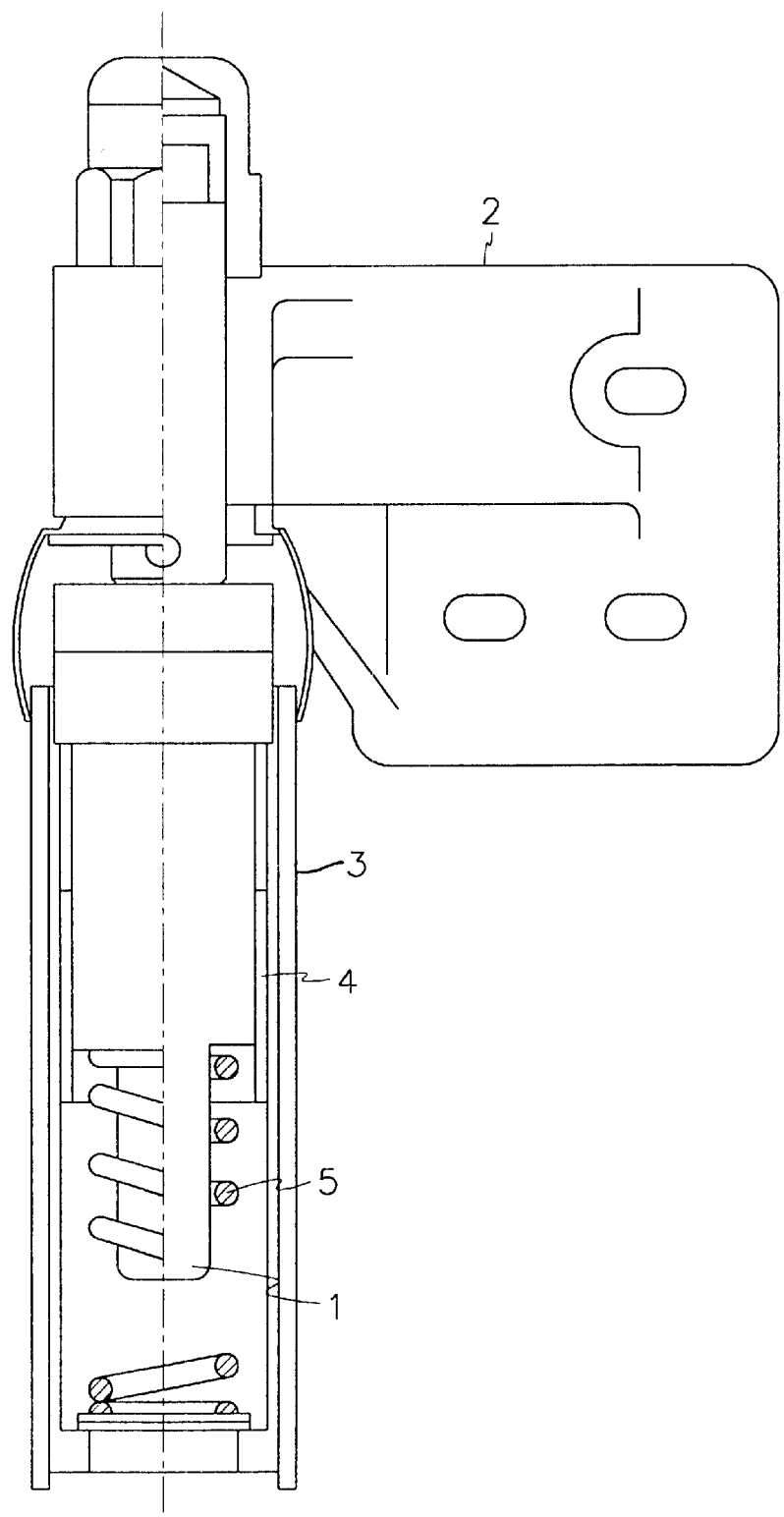
FIG. 1 is a partial cross-sectional view showing a prior art vertical rotational shaft assembly for a swing-arm door.
Figure 2:
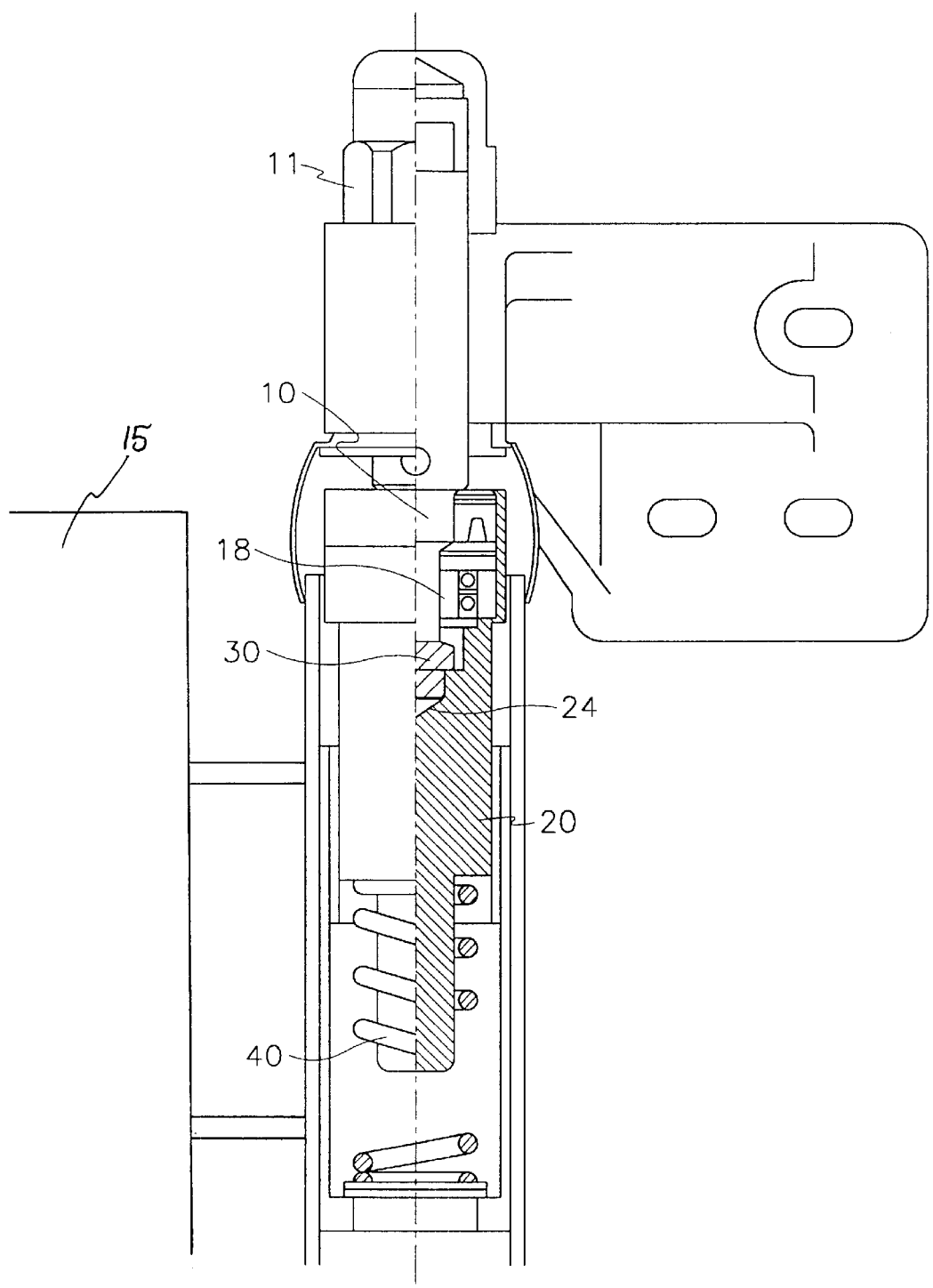
FIG. 2 is a partial cross-sectional view showing a vertical rotational shaft assembly according to a preferred embodiment of the present invention.
Figure 3:
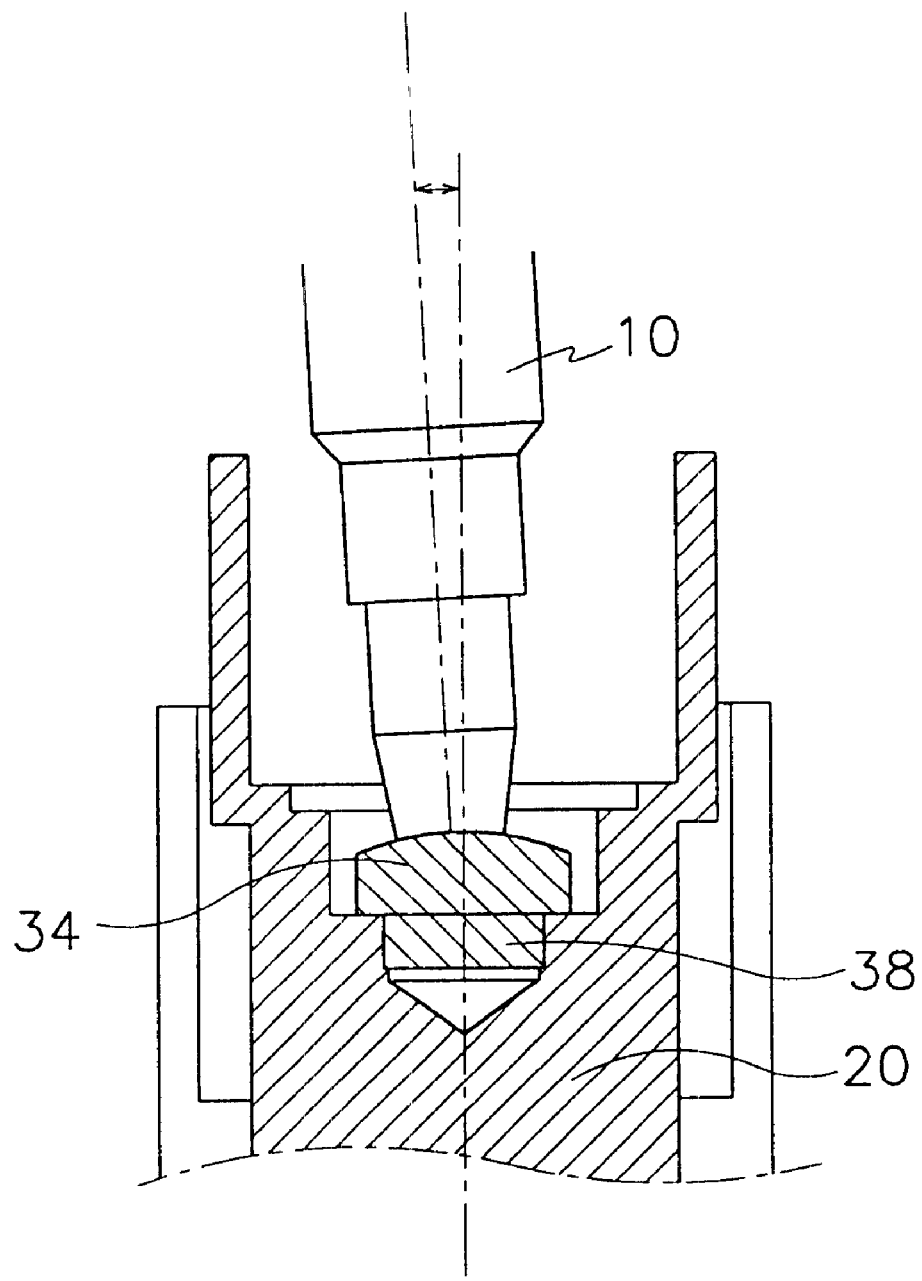
FIG. 3 is an operational view showing a behavior of the vertical rotational shaft assembly of FIG. 2

FIG. 2 is a partial cross-sectional view showing a vertical rotational shaft assembly according to a preferred embodiment of the present invention, and FIG. 3 is an operational view showing behavior of the vertical rotational shaft assembly of FIG. 2.

As shown in FIG. 2, the vertical rotational shaft assembly of the present invention comprises an upper rotational shaft 10 as a piston rod of a cylinder 11, and a lower rotational shaft 20, and is coupled to one edge of a door 15.

The upper rotational shaft 10 is supported by a bearing 18 mounted around a lower portion thereof and is concave at its lower end. The lower rotational shaft 20 is provided with a recess 24 at its upper end so as to receive a chock 30 on which a lower end of the upper rotational shaft 10 is fittedly loaded, and a coil spring 40 around its lower portion for biasing the lower rotational shaft upward.

The chock 30 has a shape of a stub bolt and comprises a head 34 having a convex upper surface formed with the same radius as the lower end of the upper rotational shaft 10, and a stem 38 which is fixed into the recess 24 of the lower rotational shaft 20.

It is known that the upper portion of the rotational shaft assembly is fixed to a vehicle body by means of a bracket.

The operation of the vertical rotational shaft assembly of the present invention will be described hereinafter.

In the state where the lower concave end of the upper rotational shaft 10 is fitted on the upper convex surface of the chock 30, when the swing-arm door is operated, the upper rotational shaft 10 moves down so as to push down the lower rotational shaft 20 overcoming an elastic force of the coil spring 40.

Even when any inner parts of the vertical rotational shaft assembly are worn by frequent use, the lower concave end of the upper rotational shaft 10 and the upper convex surface of the chock 30 are engaged to each other such that the lower rotational shaft 20 is operated stably without pivoting.

The pushing force is transmitted to the lower rotational shaft 20 via the chock 30 such that the swing-arm door rotates to be opened.

As described above, in the vertical rotation shaft assembly according to the preferred embodiment of the present invention, since the lower rotational shaft is provided with a chock having a convex upper surface which is engaged with the lower concave end of the upper rotational shaft, the vertical rotation shaft assembly can avoid malfunction even when the inner parts of the vertical rotation shaft assembly are worn by frequent use of the door.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A rotation shaft assembly for a swing-arm type door having a cylinder for actuating the door, the assembly comprising:

an upper rotational shaft extended from the cylinder as a piston rod and supported by a bearing mounted around a lower portion thereof; and a lower rotational shaft separate from the upper rotational shaft being coaxially arranged with the upper rotational shaft.

2. The rotation shaft assembly of claim 1 wherein the upper rotational shaft has a concave lower end.

3. The rotation shaft assembly of claim 2 wherein the lower rotational shaft has a recess on its upper end.

4. The rotation shaft assembly of claim 3 further comprising a chock tightly inserted into the recess of the lower rotational shaft.

5. The rotation shaft assembly of claim 4 wherein the chock has a convex upper surface formed with an identical radius to that of the concave lower end of the upper rotational shaft so as to facilitate tight contact between them.

6. The rotation shaft assembly of claim 1 further comprising a spring between the lower rotational shaft and a lower end of the cylinder.

7. The rotation shaft assembly of claim 6 wherein the spring biases the lower rotational shaft toward the upper rotational shaft.

8. The rotation shaft assembly of claim 1 further comprising a spring biasing the lower rotational shaft toward the upper rotational shaft.

* * * * *